(12) United States Patent
Nunally

(10) Patent No.: US 9,298,565 B1
(45) Date of Patent: *Mar. 29, 2016

(54) SYSTEM AND METHOD FOR IDENTIFICATION OF MEMORY

(71) Applicant: e.Digital Corporation, San Diego, CA (US)

(72) Inventor: Patrick O'neal Nunally, Escondido, CA (US)

(73) Assignee: e.Digital Corporation, San Diego, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/974,473

(22) Filed: Aug. 23, 2013

Related U.S. Application Data

(63) Continuation of application No. 12/946,057, filed on Nov. 15, 2010, now Pat. No. 8,572,440.

(51) Int. Cl.
*G06F 11/00* (2006.01)
*G06F 11/16* (2006.01)

(52) U.S. Cl.
CPC .................. *G06F 11/1666* (2013.01)

(58) Field of Classification Search
CPC ............................................... G06F 2221/0704
USPC ....................... 714/42, 54, 48, 718
See application file for complete search history.

(56) References Cited

U.S. PATENT DOCUMENTS

| 4,371,930 | A  |   | 2/1983  | Kim              |               |
|-----------|----|---|---------|------------------|---------------|
| 5,235,585 | A  | * | 8/1993  | Bish et al.      | 369/53.17     |
| 6,092,195 | A  | * | 7/2000  | Nguyen           | G11B 23/284   |
|           |    |   |         |                  | 380/22        |
| 6,161,052 | A  | * | 12/2000 | Charlton         | G06F 11/2635  |
|           |    |   |         |                  | 700/97        |
| 7,434,097 | B2 | * | 10/2008 | Guha             | G06F 11/008   |
|           |    |   |         |                  | 714/6.32      |
| 8,181,100 | B1 | * | 5/2012  | Purdham et al.   | 714/819       |
| 8,572,440 | B1 |   | 10/2013 | Nunally          |               |
| 2009/0196101 | A1 | * | 8/2009 | Abe           | 365/185.09    |

* cited by examiner

*Primary Examiner* — Dieu-Minh Le
(74) *Attorney, Agent, or Firm* — San Diego Patent Prep & Pros, Inc.; Mary Fales

(57) ABSTRACT

A system and method of identifying a memory includes detecting defects in regions of the memory, comparing the detected defects with defects contained in a previously-created defect map associated with the memory and stored in another memory of a device accessing the memory, confirming the identity of the memory where a result of the comparison indicates the detected defects match defects contained in the previously-created defect map; and denying the identity of the memory where the result of the comparison indicates the detected defects do not match the defects contained in the previously-created defect map.

20 Claims, 6 Drawing Sheets

SYSTEM AND METHOD FOR IDENTIFICATION OF MEMORY

CLAIM TO PRIORITY UNDER 35 U.S.C. §120

The present Application is a continuation of and claims the benefit of U.S. patent application Ser. No. 12/946,057 filed on Nov. 15, 2010, entitled, "SYSTEM AND METHOD FOR MANAGING INFORMATION STORED IN SEMICONDUCTORS."

BACKGROUND

1. Field

The present disclosure relates generally to computer systems and information handling systems, and, more particularly, to a system and method for employing a map of functional error or inconsistency of a semiconductor device to govern the use of data stored therein by a computer system or information handling system 2. Description of the Related Art As the value and use of information continues to increase, individuals and businesses seek additional ways to manage and secure stored information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computing system will typically include some type of information storage medium. In recent computers, the amount of memory comprised by the information handling system may be on the order of gigabytes. As memory size increases, there is an increased likelihood that part of the memory will either be manufactured defective or become defective over time. These systems may also include cryptographic systems, which are constructed with software, hardware or a combination of both.

Numerous cryptographic processes are well defined in the art and are known to generally be strong mechanisms which generally rely on the use of passwords and/or keys. These systems are often only as secure as the vigilance of their users and can create undue burden on users. Moreover, such users commonly disable or defeat the security provisions for their convenience, or for illicit purposes.

As computing systems continue to evolve and computer technology advances, the significance and value of information also is advancing. Hence there is a need for secure data repositories which allow ready access to data stored therein while preventing unauthorized copying or distribution has become a critical need.

While systems for securing financial or sensitive information access in solid-state devices such as semiconductor memory cards are well represented in the prior art, the unique issue of securing data from duplication or illicit use is becoming a pervasive problem. Large quantities of data don't simply represent value, but are instead the actual value A semiconductor memory card typically stores data in solid-state memory such as a Non Volatile Memory (NVM). After information is written to the semiconductor memory, security becomes vital. Long-term, unsupervised access to the memory lends itself to attacks of all forms to attempt to disconnect the information from the physical memory. It is possible for a skilled attacker to retrieve numerical information from a semiconductor memory card through probing of the internal components of the device, or through other unauthorized means. If card security is provided only through numerical means, such as numerical authenticators, or cryptographic processing keys, it is possible to create a counterfeit card which contains information duplicated from a legitimate card.

Some techniques offer data access security through the use of data related to physical characteristics of the storage media. These systems rely on precise measurement of solid state media process characteristics. Examples of these include variations in the remnant charge of EEPROM's, or variations in row/column addressing circuits. These and other characteristics have been used for authentication when the memory is presented, and the authenticating characteristics are measured. Such techniques are described in detail in Fernandez (U.S. Pat. No. 5,644,636).

The critical issue which cannot be addressed by the prior art are applications where data security is not simply shifted to attacks on the reader mechanisms and where data must not be duplicated or separated even by trusted and/or authorized users.

SUMMARY

In accordance with the present disclosure, an aspect of the invention discloses a method for securely storing and using information whereby a semiconductor is tested for inconsistencies and detected functional imperfections are stored in a functional defect map and used in part to secure, unsecure or govern use of data.

An aspect of the present invention significantly increases the security and rights management of the data stored in digital form by allowing the use of semiconductor components which not only bare their own unique indelible characteristics but integrate those characteristics (both static and transient) into the stored data.

In an aspect of the present invention, utilization of a semiconductors unique fabricated characteristics in this way allows an information handling system to exclusively couple data to the semiconductor component (or components) used to store, enable application of the data as well as impede copying of the stored data held in the semiconductor component, the memory component can be moved from one system to another while retaining data security. In this way, no burden is placed on the reader and in fact these systems allow for unsecured direct bus access. The importance of this improvement is magnified as semiconductors are growing to be a dominant media for mass storage.

An aspect of the present invention allows the system to maintain normal operations despite significant data security.

By minimizing the impact of security processes a system and method in accordance with the present invention can render data stored in semiconductors useful yet uncopyable.

An aspect of the present invention greatly reduces the system and users burden associated with data rights management.

According to an aspect of the invention, a method of identifying a memory, includes detecting defects in regions of the memory; comparing the detected defects with defects contained in a previously-created defect map associated with the memory and stored in another memory of a device accessing the memory; confirming the identity of the memory where a result of the comparison indicates the detected defects match defects contained in the previously-created defect map; and denying the identity of the memory where the result of the comparison indicates the detected defects do not match the defects contained in the previously-created defect map.

According to an aspect of the invention, the method further includes allowing a data exchange between the device and the memory where the identity of the memory is confirmed, and preventing the data exchange between the device and the memory where the identity of the memory is denied.

According to an aspect of the invention, the detecting the defects comprises detecting the defects in selected regions of the memory, and locations of the selected regions are predetermined.

According to an aspect of the invention, the detected defects match defects contained in the previously-created defect map where a difference between the detected defects and the defects contained in the previously-created defect map is within a predetermined error rate.

According to an aspect of the invention, when there is a difference between the detected defects and the defects contained in the previously-created defect map, the method further includes performing a secondary authentication of the memory to confirm the identity of the memory, wherein the identity of the memory is confirmed where the secondary authentication is successful.

According to an aspect of the invention, the method further includes storing the detected defects in the another memory as a newly-created defect map where the secondary authentication is successfully performed.

According to an aspect of the invention, the method further includes storing the detected defects in the another memory as a newly-created defect map associated with the memory.

According to an aspect of the invention, the method further includes determining that the memory is not a counterfeit having counterfeit data and allowing a data exchange between the device and the memory where the identity of the memory is confirmed, and determining that the memory is a counterfeit having counterfeit data and preventing the data exchange between the device and the memory where the identity of the memory is denied.

According to an aspect of the invention, the detecting the defects comprises performing a normal read process of selected cells to determine which of the selected cells of the memory were written as a logical first state but are read as a logical second state to determine which cells have an error, and comparing the cells having the error with the defect map.

According to an aspect of the invention, the method further includes writing data in a predetermined pattern of the logical first and second states to the selected cells prior to the detecting the defects.

According to an aspect of the invention, the previously-created defect map comprises a defect list of the memory used in defect management of the memory, the detecting the defects comprises writing data in a predetermined pattern to the memory in regions included on the defect list, and the comparing comprises comparing the detected defects with the defect list stored in the another memory of the device.

According to an aspect of the invention, the previously-created defect map is stored encrypted, and the comparing further comprises decrypting the encrypted previously-created defect map and comparing the decrypted previously-created defect map with the detected defects.

According to an aspect of the invention, the memory comprises at least one of a semiconductor memory, a magnetic memory, an optical memory, or combinations thereof.

According to an aspect of the invention, a method of providing identification of a memory includes detecting defects in regions of the memory; and storing the detected defects as a defect map associated with the memory in another memory of a device accessing the memory so as to uniquely identify the memory to the device.

According to an aspect of the invention, the method further includes, after reconnecting the memory to the device, confirming an identity of the memory by again detecting defects in regions of the memory, comparing the again detected defects with the stored defect map, confirming the identify of the memory where a result of the comparison indicates the again detected defects match defects contained in the stored defect map, and denying the identity of the memory where the result of the comparison indicates the again detected defects do not match the defects contained in the stored defect map.

According to an aspect of the invention, the method further includes allowing a data exchange between the device and the memory where the identity of the memory is confirmed, and preventing the data exchange between the device and the memory where the identity of the memory is denied.

According to an aspect of the invention, the detecting the defects comprises detecting the defects in selected regions of the memory, and locations of the selected regions are predetermined.

According to an aspect of the invention, the again detected defects match defects contained in the stored defect map where a difference between the again detected defects and the defects contained in the stored defect map is within a predetermined error rate.

According to an aspect of the invention, the method further includes, when there is a difference between the again detected defects and defects contained in the stored defect map, performing a secondary authentication of the memory to confirm the identity of the memory, wherein the identity of the memory is confirmed where the secondary authentication is successful.

According to an aspect of the invention, the method further includes storing the again detected defects in the another memory as an updated defect map after the secondary authentication is successfully performed.

According to an aspect of the invention, the method further includes storing the again detected defects in the another memory as a newly-created defect map associated with the memory.

According to an aspect of the invention, the method further includes determining that the memory is not a counterfeit having counterfeit data and allowing a data exchange between the device and the memory where the identity of the memory is confirmed, and determining that the memory is a counterfeit having counterfeit data and preventing the data exchange between the device and the memory where the identity of the memory is denied.

According to an aspect of the invention, the detecting the defects comprises performing a normal read process of selected cells to determine which of the selected cells of the memory were written as a logical first state but are read as a logical second state to determine which cells have an error, and comparing the cells having the error with the stored defect map.

According to an aspect of the invention, the method further includes writing data in a predetermined pattern of the logical first and second states to the selected cells prior to the again detecting the defects.

According to an aspect of the invention, the stored defect map comprises a defect list of the memory used in defect management of the memory, and the detecting the defects comprises reading the defect list from the memory.

According to an aspect of the invention, the stored defect map comprises a defect list of the memory used in defect management of the memory, the detecting the defects comprises reading the defect list from a memory, the again detecting the defects comprises writing data in a predetermined pattern to the memory in regions included on the defect list, and the comparing comprises comparing the again detected defects with the defect list stored in the another memory of the device.

According to an aspect of the invention, the method further includes encrypting the defect list prior to storing the defect list.

According to an aspect of the invention, an information handling system includes: a memory which stores a defect map associated with another memory connectable to the information handling system; and a processor which, when the another memory is connected to the information handling system, detects defects in regions of the another memory, compares the detected defects with defects contained in the stored defect map, confirms the identity of the another memory where a result of the comparison indicates the detected defects match defects contained in the stored defect map, and denies the identity of the memory where the result of the comparison indicates the detected defects do not match the defects contained in the stored defect map.

According to an aspect of the invention, the processor allows a data exchange between the information handling system and the another memory where the identity of the another memory is confirmed, and prevents the data exchange between the information handling system and the another memory where the identity of the another memory is denied.

According to an aspect of the invention, the processor detects the defects in selected regions of the another memory, and locations of the selected regions are pre-determined.

According to an aspect of the invention, the processor confirms the identity of the another memory when a difference between the detected defects and the defects contained in the stored defect map is within a predetermined error rate.

According to an aspect of the invention, further comprising, when the detected defects do not match defects contained in the stored defect map, the processor performs a secondary authentication of the another memory to confirm the identity of the another memory.

According to an aspect of the invention, the processor stores the detected defects in the memory as a newly-created defect map where the secondary authentication is successfully performed.

According to an aspect of the invention, the processor stores the detected defects in the memory as a newly-created defect map associated with the another memory.

According to an aspect of the invention, the processor further determines that the another memory is not a counterfeit having counterfeit data and allows a data exchange between the information handling system and the another memory where the identity of the another memory is confirmed, and determines that the another memory is a counterfeit having counterfeit data and prevents the data exchange between the information handling system and the another memory where the identity of the another memory is denied.

According to an aspect of the invention, the processor detects the defects while performing a normal read process of selected cells to determine which of the selected cells of the another memory were written as a logical first state but are read as a logical second state to determine which cells have an error, and comparing the cells having the error with the defect map.

According to an aspect of the invention, the processor writes data in a predetermined pattern of the logical first and second states to the selected cells prior to the detecting the defects.

According to an aspect of the invention, the stored defect map comprises a defect list of the another memory used in defect management of the another memory which the processor copied and stored in the memory, and the processor detects the defects by writing data in a predetermined pattern to the another memory in regions included on the defect list, and compares the detected defects with the defect list stored in the memory.

According to an aspect of the invention, the processor encrypts the stored defect map and decrypts the encrypted defect map to perform the comparison.

According to an aspect of the invention, the another memory comprises at least one of a semiconductor memory, a magnetic memory, an optical memory, or combinations thereof.

According to an aspect of the invention, the processor performs the comparison when the processor detects that the another memory has re-attached to the information handling system after being detached from the information handling system.

According to an aspect of the invention, the processor performs the comparison when the processor detects that the another memory has reestablished a network connection to the information handling system after losing the network connection with the information handling system.

According to an aspect of the invention, an information handling system includes: a memory; and a processor which, when another memory is connected to the information handling system, detects defects in regions of the another memory, and stores the detected defects as a defect map associated with the another memory in the memory so as to uniquely identify the another memory to the information handling system.

According to an aspect of the invention, the processor, after the information handling system reconnects to the another memory, confirms an identity of the another memory by again detecting defects in regions of the another memory, comparing the again detected defects with the stored defect map, confirming the identify of the another memory where a result of the comparison indicates the again detected defects match defects contained in the stored defect map, and denying the identity of the another memory where the result of the comparison indicates the again detected defects do not match the defects contained in the stored defect map.

According to an aspect of the invention, the processor allows a data exchange between the information handling system and the another memory where the identity of the another memory is confirmed, and prevents the data exchange between the information handling system and the another memory where the identity of the another memory is denied.

According to an aspect of the invention, the processor detects the defects in selected regions of the another memory, and locations of the selected regions are pre-determined.

According to an aspect of the invention, the processor confirms that the again detected defects match defects contained in the stored defect map where a difference between the again detected defects and the defects contained in the stored defect map is within a predetermined error rate.

According to an aspect of the invention, when the result of the comparison indicates the again detected defects do not match defects contained in the stored defect map, the processor performs a secondary authentication of the another memory to confirm the identity of the another memory.

According to an aspect of the invention, the processor further stores the again detected defects in the memory as an updated defect map where the secondary authentication is successfully performed.

According to an aspect of the invention, the processor further stores the again detected defects in the memory as a newly-created defect map associated with the another memory.

According to an aspect of the invention, the processor determines that the another memory is not a counterfeit having counterfeit data and allows a data exchange between the information handling system and the another memory where the identity of the another memory is confirmed, and determines that the another memory is a counterfeit having counterfeit data and prevents the data exchange between the information handling system and the another memory where the identity of the another memory is denied.

According to an aspect of the invention, the processor detects the defects by performing a normal read process of selected cells to determine which of the selected cells of the another memory were written as a logical first state but are read as a logical second state to determine which cells have an error, and comparing the cells having the error with the defect map.

According to an aspect of the invention, the processor writes data in a predetermined pattern of the logical first and second states to the selected cells prior to the detecting the defects.

According to an aspect of the invention, the stored defect map comprises a defect list of the another memory used in defect management of the another memory which the processor copied and stored in the memory.

According to an aspect of the invention, the stored defect map comprises a defect list of the another memory used in defect management of the another memory which the processor copied and stored in the memory, and the processor detects the defects by writing data in a predetermined pattern to the another memory in regions included on the defect list, and compares the detected defects with the defect list stored in the memory.

According to an aspect of the invention, the processor encrypts the defect list prior to storing the defect list in the memory.

According to an aspect of the invention, a computer readable medium is encoded with processing instructions for implementing the method of aspects of the invention using one or more processors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
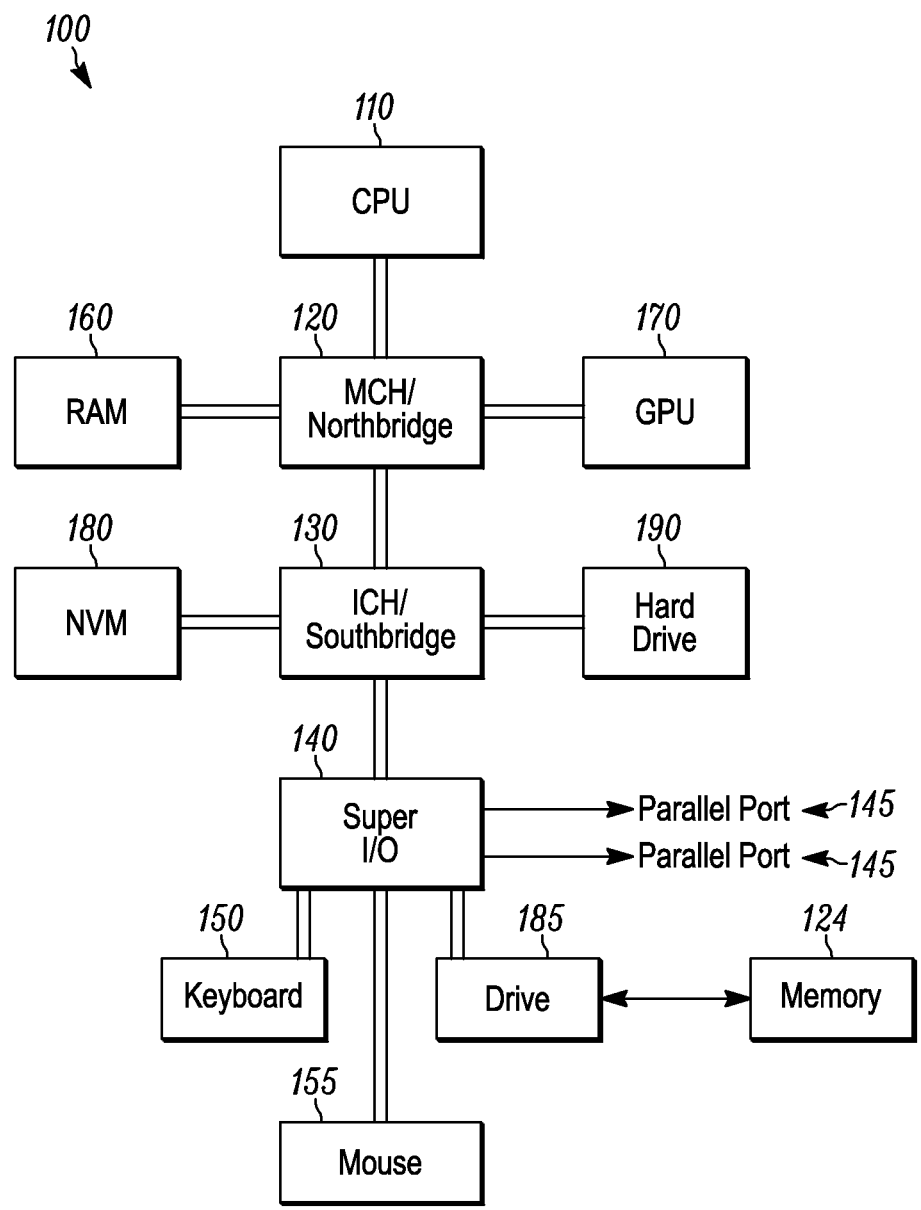
FIG. 1 illustrates a typical information handling system adapted to manage data use according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an information handling system 100 according to an aspect of the invention. The shown information handling system 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 100 may be a personal computer, a network storage device, a tablet, a netbook, a server, a personal digital assistant, a smart phone, a personal media player, or any other suitable device and may vary in size, shape, performance, functionality, and price.

While not required in all aspects, the shown information handling system 100 includes a random access memory (RAM) 160, one or more processing resources such as a central processing unit (CPU) 110 or hardware or software control logic, a ROM, and/or other types of nonvolatile memory (NVM) 180.

While not required in all aspects, the shown information handling system 100 includes one or more disk drives such as a hard drive 190, one or more network ports for communication with external devices as well as various input and output (I/O) devices, such as a keyboard 150, and a mouse 155. The information handling system 100 may also include one or more buses operable to transmit communications between the various hardware components, and may also include or be connectable to a video display, speaker, and/or microphone to facilitate communication with a user of the information handling system 100.

The CPU 110 is communicatively coupled to a memory controller hub (MCH) or north bridge 120. The memory controller hub 120 is coupled to the RAM 160 and a graphics processing unit (GPU) 170. The memory controller hub 120 is also coupled to an 1/0 controller hub or south bridge 130. The 1/0 hub 130 is coupled to storage elements of the information handling system 100. As shown, the storage elements include the NVM 180, and the hard drive 190 of the computer system. While not required in all aspects, the NVM 180 can be a flash ROM for the Basic Input/Output System (BIOS) of the information handling system 100.

While not required in all aspects, the I/O hub 130 is also coupled to a Super I/O chip 140. The shown I/O chip 140 is coupled to many of the I/O ports of the information handling system 100, including the keyboard 150, mouse 155, parallel ports 145, and a memory drive 185. However, it is understood that the ports can be connected to other elements in addition to or instead of the shown keyboard 150, mouse 155, and parallel ports 145, such as a touch screen display, a printer or multifunction device, a display, speakers, a microphone, an external drive or other like peripheral.

The memory drive 185 is connectable to the information handling system 100. The memory 185 can be a semiconductor memory, an optical memory, and/or a magnetic memory. The memory 185 can be a rewritable memory, a write once memory, and/or a read only memory. The memory drive 185 receives the information handling system 100 data, and transfers the data with respect to the information handling system 100. The memory drive 185 can be a read only drive, and can be a read and write drive depending on the type of information handling system 100. While shown as being connected through the Super I/O chip 140, and is understood that the memory drive 185 could be connected to the I/O hub 130 in addition to or instead of using the Super I/O chip 140. While shown as detachable from the information handling system 100, it is understood that the memory 185 could be not detachable in aspects of the invention. Further, in aspects of the invention, the memory drive 185 can be connected to the information handling system 100 through a network, whereby the information handling system 100 could be disconnected from the memory drive 185, when the information handling system 100 is powered off, or when the information handling system 100 purposely disconnects from the memory drive 185.

The CPU 110 identifies the memory 185 using a reference map stored in a memory (such as the NVM 180) by comparing defects in the memory 185 and those in the reference map according to aspects of the invention, and determines whether the memory 185 is counterfeit or known according to aspects of the invention described below. A result of the identification can be for the CPU 110 to allow a data transfer with respect to the memory 185 where the memory 185 is found to be known, and prevent the data transfer with respect to the memory 185 where the memory 185 is found to be counterfeit. In other aspects, the information handling system 100 can inform a user (such as through a pop-up window on a display, logging of the alert in an event monitor, or an audio alert played through speakers) where the memory 185 is found to be counterfeit. In other aspects, where the user is informed of the counterfeit nature of the memory 185, the user can permit the data transfer with respect to the memory 185.

Figure 2:
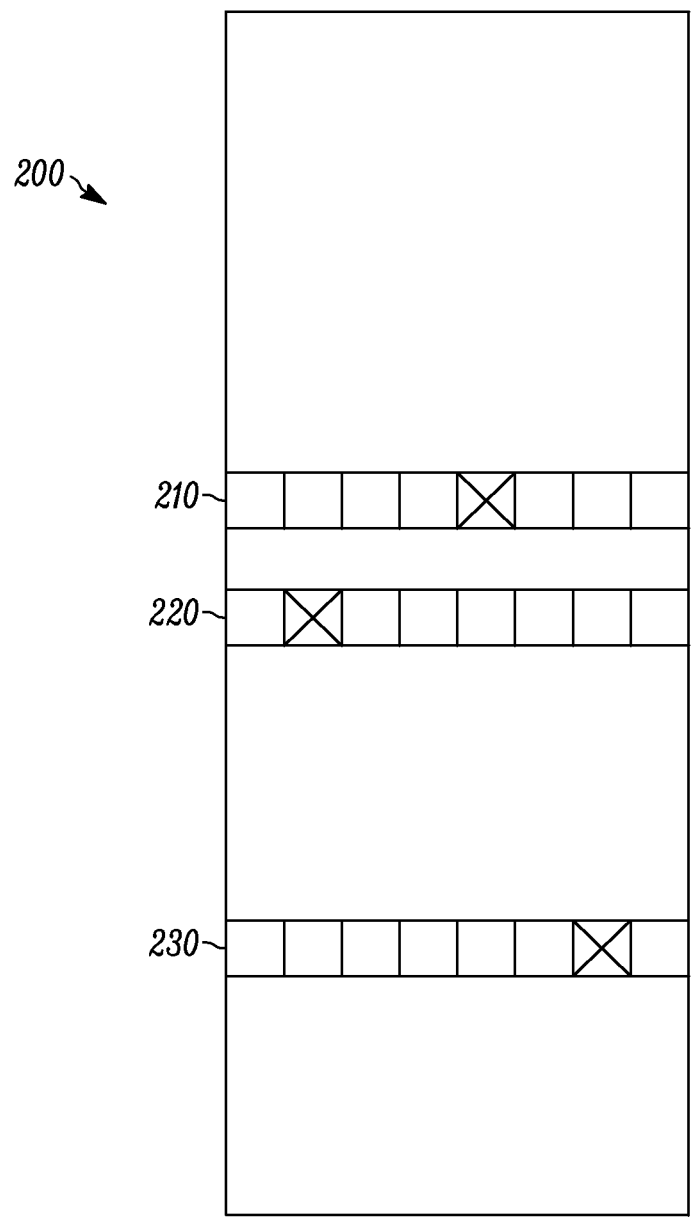
FIG. 2 illustrates a process for writing data to semiconductor memory cells according to an embodiment of the present invention.

FIG. 2 presents an exemplary memory space 200. As such, the exemplary memory space 200 has defective regions 210, 220, 230. As shown, each defective region 210, 220, 230 has non-defective sectors, and at least one defective sector (shown with an X). The exemplary memory space 200 may be part of a flash memory, which can be a removable memory such as that in the detachable memory 185 shown in FIG. 1, or any other component capable of being addressed as memory. To the extent these defective regions 210, 220, 230 are in existence at the time of manufacture of the memory component, information regarding the location of the defective memory regions 210, 220, 230 may be stored in a secure address in the memory 200 during manufacture. Specifically, the memory component is tested at the time of manufacture either externally or via built in self test (BIST) methods, and any information regarding the location of defective memory is stored in a secure nonvolatile address of the device. An example of such tests and defect management as used in optical media is described in 120 mm DVD Rewritable Disk (DVD-RAM), Standard ECMA-272 (2nd Edition—June 1999), the disclosure of which is incorporated by reference.

Such defect information can be stored on the hard drive 190 and/or the detachable memory 185 of FIG. 1 for use in defect management, such as in a primary defect list (PDL). Moreover, where errors occur after use of the memory 185 of FIG. 1, such additional defects can also be stored on the memory, such as in a secondary defect list (SDL). In this manner, the processor using the memory, such as the CPU 110 of FIG. 1, is able to utilize the memory and avoid defective locations. Further, since the defect list keeps changing as new defects appear, aspects of the invention use these changes in defect locations to work to increase the security of the data contained on the memory.

Figure 3:
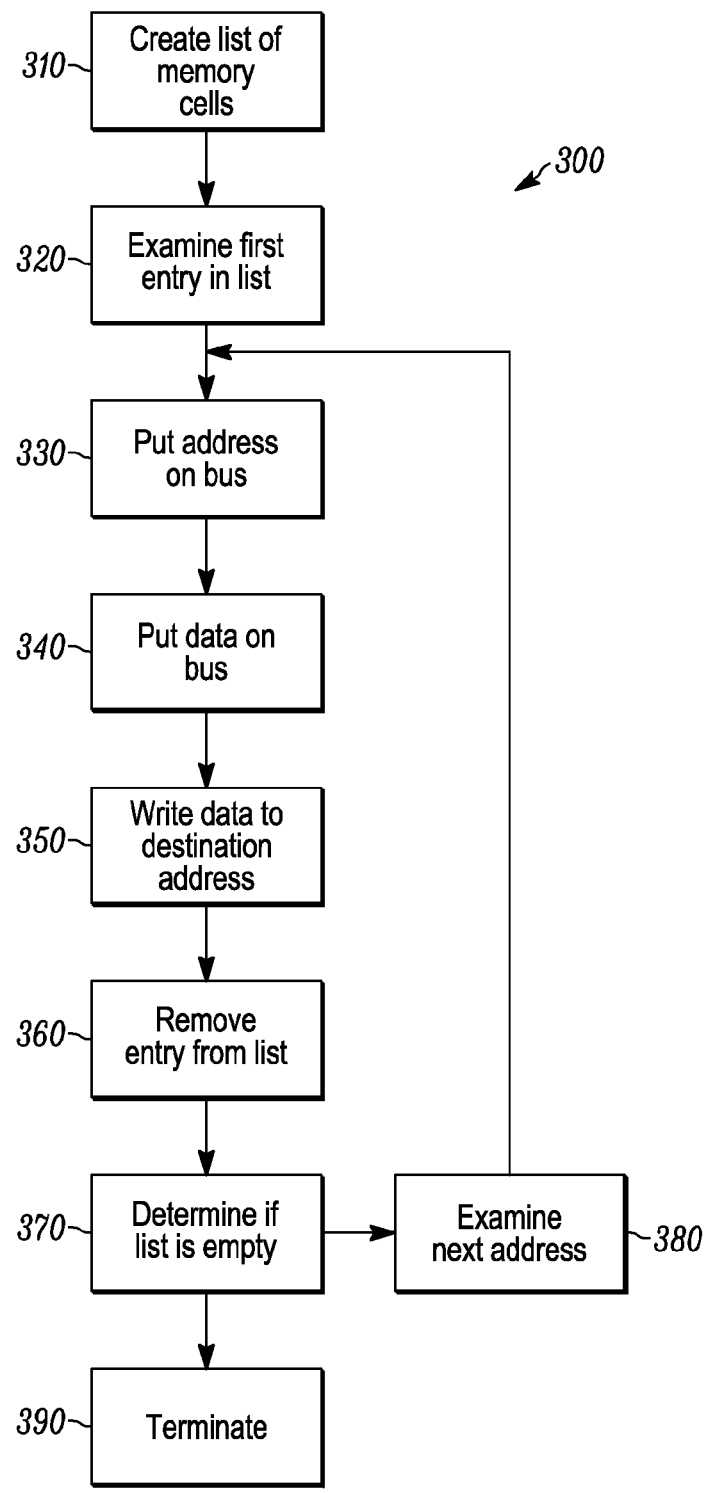
FIG. 3 illustrates a process for reading data from semiconductor memory cells according an embodiment of to the present invention.

FIG. 3 illustrates a process 300 for writing data according to an embodiment of the present invention with reference to a semiconductor memory. The data written can then be used to determine patterns of memory cells static, dynamic or transient anomalies of the semiconducting device to which the data has been written. The process of determining the patterns of static, dynamic and transient error is discussed below in connection with FIG. 4. The process may suitably be employed with a data storage device such as the information handling system 100, employing a processor 110, the detachable memory 185 and data, address and control buses similar to those illustrated in FIG. 1 above. While illustrated in the presently preferred context of the processor 110 communicating with the detachable memory 185, it will be recognized that the techniques of the present invention may be employed with any semiconducting device, and other types of storage.

At step 310, a list of selected memory cells to which data is to be written is created. While not required in all aspects, the list of selected memory cells need not be all of the memory cells used in the memory array, but instead are memory cells in predetermined locations across the memory array. Thus, as compared to defect management techniques which evaluate and account for defects in the memory array as a whole, only the selected memory cells are used for purposes of identification as will be discussed in detail below. However, it is understood that aspects of the invention can utilize all of the memory cells as opposed to only selected ones.

At step 320, a value of "1" or "0" is associated with each memory cell of the list, as the data to be written to that memory cell. At step 320, the first entry in the list is examined to determine the destination address where the data is to be written. At step 330, the destination address is placed on the address bus. At step 340, data is placed on the data bus. At step 340, the control bus is set to enable a write operation. At step 350, the data is written to the destination address. At step 360, the entry for which the data was written is removed from the list. At step 370, the list is examined to determine if it is empty. If the list is not empty, the process proceeds to step 380 and the next entry on the list is examined to determine the destination address where data is to be written. The process then returns to step 330. If the list is empty, the process terminates at step 390. This method as described in FIG. 3 is offered for illustrative purposed it will be recognized by one of ordinary skill in the art that Built in Self Test (BIST) may also be employed in the determination of static, dynamic and transient errors in a semiconducting memory.

Figure 4:
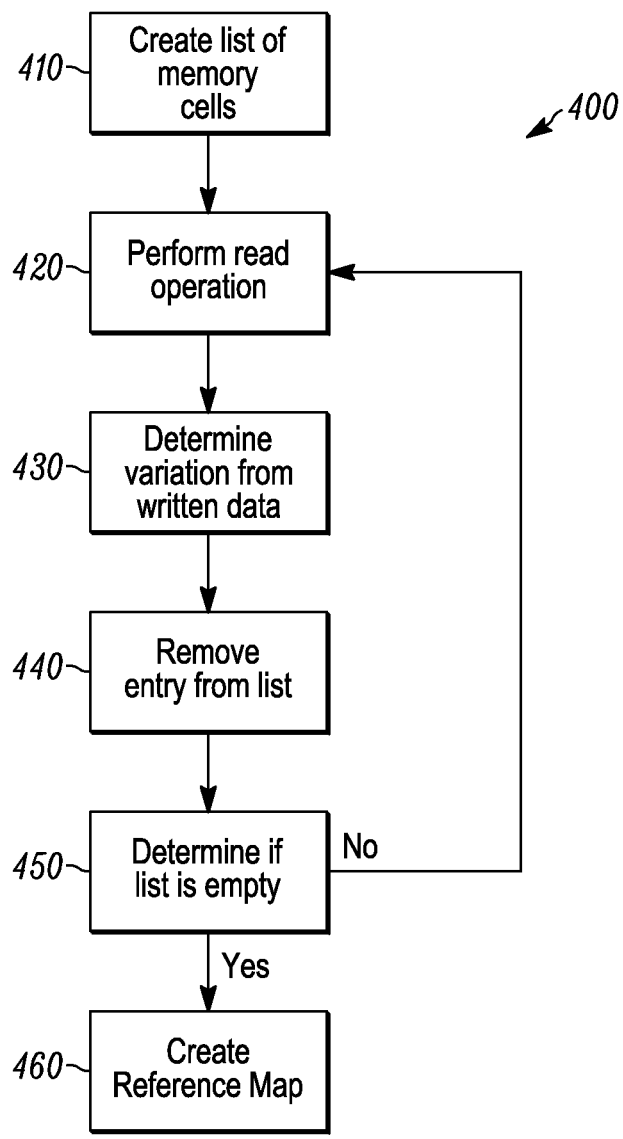
FIG. 4 illustrates an alternative process for reading data from semiconductor memory cells according to an embodiment of the present invention.

FIG. 4 illustrates a process 400 for obtaining and storing data representing functional errors in selected programmed memory cells of a memory array according to an embodiment the present invention. At step 410, a list of selected memory cells is established. The list may be the same as the list used in step 310. Alternately, the list can be for regions having defective sectors on the primary defect list (PDL) or secondary defect list (SDL) read from the memory array and is thus potentially variable each time the memory array is used.

At step 420, a read operation is performed for the selected memory cells. At step 430, data from each of the selected cells which was read in the read operation of step 420 is verified to have the same or a different logical value than the logical value written in step 350. By way of example, where the data contained at the selected cell is assigned the level of trapped charges indicated by the threshold, and a value representing the assigned level of trapped charges is stored for each cell. A cell which contains a logical "1" but which was read as a logical "0" in the read operation of step 420 or a cell which contains a logical "0" but which was read as a logical "1" in the read operation of step 420. At step 440, each of the cells having a variation (e.g., which was written as a "0" and recognized as a "1", and which was written as a "1" and recognized as a "0") is removed from the list of selected memory cells. At step 450, the list of selected cells is examined to determine if it is empty. If the list is not empty, the process proceeds to step 420. If the list is empty, the process proceeds to step 460. At step 460, the stored representations of the error map for the selected cells are assembled to create a reference fingerprint which can be used to identify the memory array.

The reference fingerprint is then stored in the device which is accessing the memory array. By way of example, the reference fingerprint can be stored in hard drive 190 of the system 100 of FIG. 1, and the memory array could be the memory 185 of FIG. 1. Thus, in subsequent uses of the memory array whose reference fingerprint is determined, the identity of the memory array can be verified by the device using the reference fingerprint even where the memory array has been detached from the device. Where the identity is verified, it is determined that the data on the memory array is not a duplicate or from a counterfeit card which contains information duplicated from a legitimate card having the reference fingerprint.

Figure 5:
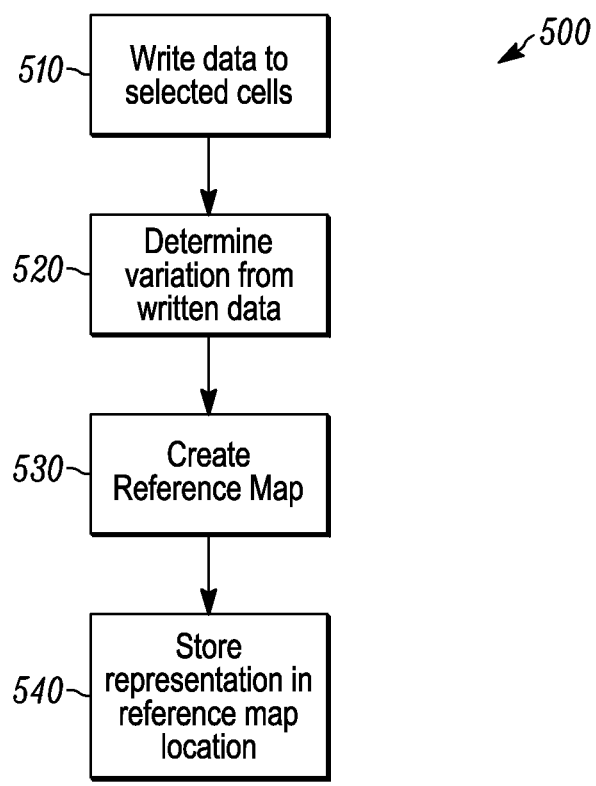
FIG. 5 illustrates a process for generating a reference fingerprint of data stored in semiconductor memory cells according an embodiment of to the present invention.

FIG. 5 illustrates a process 500 for writing data to and reading data from selected cells of a semiconductor memory array in order to generate a reference map comprising data representative of "stuck at", retention and leaking defects (corresponding to the static, dynamic and transient defects) in the array according to an aspect of the invention. The reference map is generated after data is written to the array. At step 510, data is written to selected cells of the memory array, such as through using the process illustrated in FIG. 3. At step 520, the defects of the selected cells are determined, such as through using the process of FIG. 4. At step 530, representations of error location and types are used to create a reference map which uniquely identifies the semiconducting device which was written. Alternatively, the reference fingerprint may comprise a linear feedback shift register to compact the error locations rather than storing the numerical representations of locations and types of error obtained in step 520. At step 540, the representations of the reference defect locations are stored for use in subsequently managing data access to subsequent data stored in the semiconductor, and to identify the memory array even where the memory array has been removed from the device as compared to a duplicate of the memory array.

While not required in all aspects, the reference defect locations may be used as functional memory to store data during normal use. Thus, data management information in a chosen location within the memory array, or alternatively may be passed to an output of the memory device for external storage may offer session keying and memory patterning which is only replicable by the semiconductor itself without sacrificing storage space otherwise usable by the memory device. As such, the reference map is unique to the memory device and is usable to identify the semiconductor memory when subsequently used by the device.

Moreover, while not required in all aspects, where the reference map is updated for errors which grow during use in addition to errors found during manufacture, the uniqueness of the reference map increases since the fingerprint has more unique data points.

While not required in all aspects, the reference defect locations and/or reference map may be encrypted before storage in the device.

Also, while not required in all aspects, the manufacturer of the memory array could introduce or allow for higher error rates on the memory array, thereby improving the number of defective locations and the uniqueness of the reference map. As such, while the memory array would have a reduced storage, the memory array would also be more secure and identifiable according to aspects of the invention. A further advantage is that the manufacturer costs could be reduced since, with a higher error rate being allowed, fewer memory arrays would be deemed unacceptable and the manufacturing tolerances could be loosened to allow more of the defective locations to be introduced into the resulting memory array. By way of example, the lessening of manufacturing tolerances to purposefully introduce errors randomly in semiconductor, magnetic or optical would provide a greater abundance of intermittent error (i.e., while one can over voltage a memory location to force it to ground or power, but it cannot be made intermittent where it loses its data over a couple of clock cycles). For low cost magnetic equivalents, such introduction would equate to inadequate distribution of the ferric material in a magnetic strip and disk drives would be more like semiconductors (i.e. process contamination, etc.). Optical memory could allow bits being inscribed onto the aluminum in a loose fashion such that a segment of information (likely in a known place) will be read differently at times as the tolerance of the reader has been disregarded to create interspersed errors. However, other methods can be used to introduce or allow such errors at the manufacturing stage in other aspects of the invention.

Figure 6:
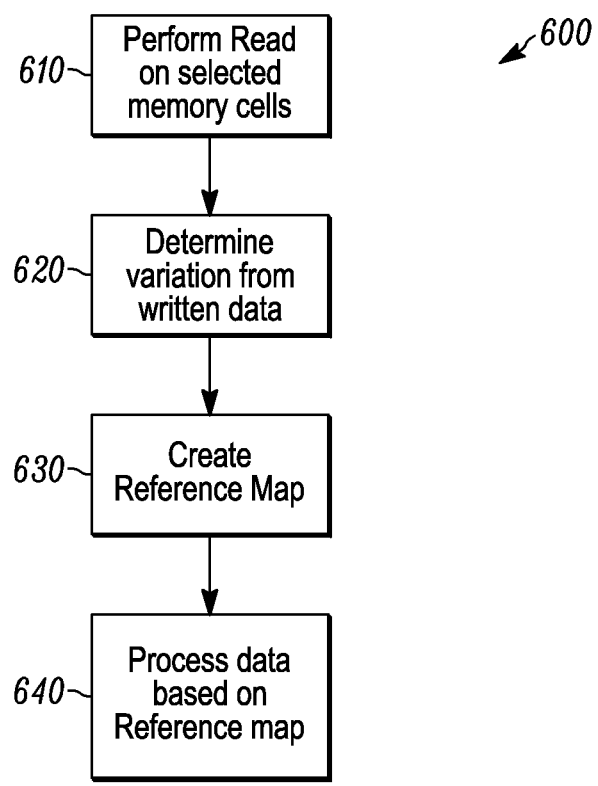
FIG. 6 illustrates a process for authenticating data stored in semiconductor memory cells by employing a reference fingerprint in accordance with an embodiment of the present invention.

FIG. 6 illustrates a process 600 for using data stored in a memory device according to an aspect of the present invention. At step 610, the selected memory cells from which the reference defect locations was created are read using a normal read process to determine which cells were written as logical "1s" and which cells were written as logical "0s". At step 610, the selected memory cells from which the reference defect locations were created are read which if duplicated directly will yield a static, dynamic or transient error thereby corrupting local data integrity unless conditionally filtered by the reference map. At step 620, the read result from step 610 is compared with the stored reference map of the device. While not required in all aspects, the reference map can be generated by the device in a prior session of using the memory device. At step 630, transient data variations are added into the static reference map thus creating the active reference map.

Alternately, the reference map can be retrieved from an external location (such as a server), such as where a reader retrieves an identification of the memory device (such as from the memory device), sends the retrieved identification to the external location, retrieves the reference map from the external location, and stores the reference map so as to authenticate the memory device.

Variations are detected at step 620. If there are variations, it is determined that the memory array is not recognized by the device, and data access is denied at step 640. If there are no variations, it is determined that the memory array is recognized by the device, and data access is allowed at step 640. In this manner, a mechanism for restricting access by and to the memory array is provided.

While not required in all aspects, as additional defects can be generated after the reference map was stored in the device, it is understood that the device could allow access where a statistically small variation exists at step 620. Where the variation is small, the device could automatically allow the access or could request some form of secondary authentication (such as from a user) and allow the access where the secondary authentication is satisfied. Where there is this access after a small variation, aspects of the invention allow the device to revise the reference map stored in the device using the new list of defective memory cells.

According to an aspect of the invention, after the memory array is recognized by the device, and data access is allowed at step 640, on completion of a data transfer operation, the reference map is updated. By way of example, after data is written to the memory array, a verification operation is performed to confirm that the data is written correctly. Where the verification operation detects an error in the written data, the defective location is added to the reference map. Similarly, where a read operation is performed and a location cannot be read but was not previously found to be defective, the defective location is added to the reference map. The updated reference map is stored in the device for a next usage of the memory array in the device. In this manner, the reference map is updated to account for defects which occur during each data transfer session, which further improves the identification of the memory array by the device.

While not required in all aspects, it is understood that additional security measures could be used in addition to the variation detection in order to ensure that the identity of the memory array is proper and the data on the memory array is not counterfeited.

While described in terms of using defects on semiconductor memory, it is understood that aspects of the invention could be used with defects on other types of memories, including optical memory such as Blu-ray, holographic and DVD memory, and magnetic memory such as hard drives. Further, while described in terms of creating a reference map including reference defect locations, aspects could also use primary and/or secondary defect lists used in defect management of the memory and which could be encrypted and stored on the reading/writing device and later used to verify if the same memory has been reconnected to the reading/writing device. Lastly, while described in terms of the reference map, other aspects of the invention could store a disk image with the known reference defect locations, and the disk image could be compared with the memory when reconnected to determine if the defect locations have changed.

While not required in all aspects, elements of the present invention can be implemented using computer software and/or firmware encoded on a computer readable medium and executed by one or more processors and/or computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for uniquely identifying a memory drive, comprising:
    detecting defects in regions of the memory drive;
    storing the detected defects as a defect map;
    associating the defect map with the memory drive;
    storing the associated defect map in a second non-transitory computer readable medium;
    using the stored associated defect map to thereafter uniquely identify the memory drive; and
    using the unique identification for security purposes between the memory drive and second non-transitory computer readable medium.

2. The method of claim 1, further comprising:
    allowing a data exchange between a device with access to the second non-transitory computer readable medium and the memory drive where the identity of the memory drive is confirmed; and
    preventing the data exchange between the device and the memory drive where the identity of the memory is denied.

3. The method of claim 1, wherein the detecting the defects comprises detecting the defects in selected regions of the memory drive, and locations of the selected regions are predetermined.

4. The method of claim 1, wherein, the stored defect map comprises a defect list of the memory drive used in defect management of the memory drive, and the detecting the defects comprises reading the defect list from the memory drive.

5. The method of claim 1, further comprising:
    encrypting the defect list prior to storing the defect list.

6. The method of claim 1, wherein the detection of defects matching defects contained in the previously-created defect map is used in part to decrypt data stored within said memory drive.

7. The method of claim 1, wherein the detection of defects matching defects contained in the previously-created defect map is used in part to decrypt data stored within the second non-transitory computer readable medium.

8. An apparatus for uniquely identifying a memory drive, comprising:
    a memory; and
    a processor, coupled to the memory, adapted to communicate with a memory drive to detect defects in regions of the memory drive, and to store the detected defects as a defect map, to associate the defect map with the memory drive, to store the associated defect map in the memory, to use the stored associated defect map to subsequently uniquely identify the memory drive, to use the unique identification for security purposes between the memory drive and the memory so that the memory knows the memory drive in order to trust it.

9. The apparatus of claim 8, wherein the processor is adapted to detect the defects in selected regions of the memory drive, and locations of the selected regions are predetermined.

10. The apparatus of claim 8, wherein the stored defect map comprises a defect list of the memory drive used in defect management of the memory drive which the processor is adapted to copy and store in the memory drive.

11. The apparatus of claim 8, wherein the processor is adapted to encrypt the defect list prior to storing the defect list in the memory.

12. The apparatus of claim 8, wherein the processor is adapted to encrypt data to be stored in the memory based on detected defects in regions of the memory.

13. The apparatus of claim 8, wherein the processor is adapted to encrypt data to be stored in the memory based on detected defects in regions of the memory drive.

14. A non-transitory computer readable medium encoded with processing instructions, comprising:
    code to detect defects in regions of a first memory;
    code to store the detected defects as a defect map;
    code to associate the defect map with the first memory;
    code to store the associated defect map in a second memory;
    code to use the stored associated defect map to thereafter uniquely identify the first memory; and
    code to use the unique identification for security purposes between the first memory and the second memory so that the second memory can trust the first memory.

15. The non-transitory computer readable medium of claim 14, further comprising:
    code to allow a data exchange between the second memory and the first memory where the identity of the first memory is confirmed; and
    code to prevent the data exchange between the second memory and the first memory where the identity of the first memory is denied.

16. The non-transitory computer readable medium of claim 14, wherein the code to detect the defects comprises code to detect the defects in selected regions of the first memory, and locations of the selected regions are pre-determined.

17. The non-transitory computer readable medium of claim 14, wherein the stored defect map comprises a defect list of the first memory used in defect management of the first memory, and the code to detect the defects comprises code to read the defect list from the first memory.

18. The non-transitory computer readable medium of claim 14, further comprising:
    code to encrypt the defect list prior to storing the defect list.

19. The non-transitory computer readable medium of claim 14, wherein detection of defects matching defects contained in the previously-created defect map is used in part to decrypt data stored within said second memory.

20. The non-transitory computer readable medium of claim 14, wherein detection of defects matching defects contained in the previously-created defect map is used in part to decrypt data stored within said first memory.

\* \* \* \* \*